Oct. 5, 1965  F. A. GASPARINI ETAL  3,209,945
SELECTIVE ARTICLE DISPENSING APPARATUS
Filed Feb. 18, 1963  4 Sheets-Sheet 1

Oct. 5, 1965   F. A. GASPARINI ETAL   3,209,945
SELECTIVE ARTICLE DISPENSING APPARATUS
Filed Feb. 18, 1963   4 Sheets-Sheet 2
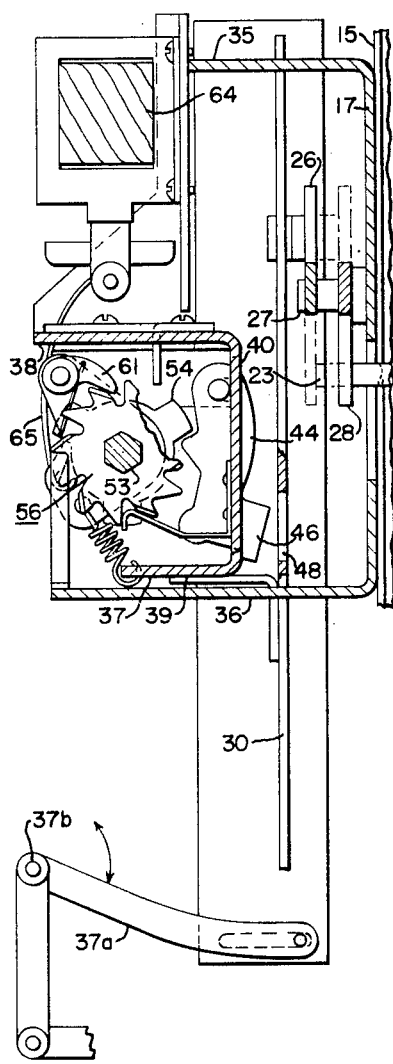
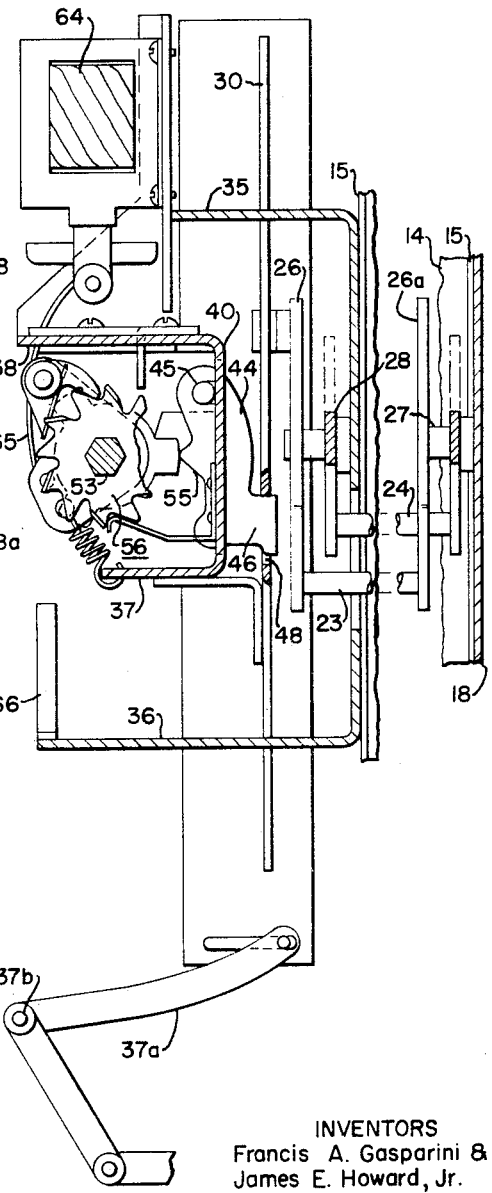
INVENTORS
Francis A. Gasparini &
James E. Howard, Jr.
BY Oct. 5, 1965 F. A. GASPARINI ETAL 3,209,945
SELECTIVE ARTICLE DISPENSING APPARATUS
Filed Feb. 18, 1963 4 Sheets-Sheet 3

United States Patent Office 3,209,945
Patented Oct. 5, 1965

3,209,945
SELECTIVE ARTICLE DISPENSING APPARATUS
Francis A. Gasparini, Springfield, and James E. Howard, Jr., Feeding Hills, Mass., assignors to Westinghouse Electric Corporation, Pittsburgh, Pa., a corporation of Pennsylvania
Filed Feb. 18, 1963, Ser. No. 259,145
5 Claims. (Cl. 221—67)

This application is a continuation-in-part of United States patent application Serial No. 173,222, filed February 14, 1962 by the same inventors and assigned to the same assignee as this application.

This invention relates to despensing apparatus, more particularly to a dispensing machine for dispensing beverage bottles of different flavors or other articles of different kinds, and it has for an object to provide an improved machine of this type.

A further object is to provide such a dispensing machine operated by a single driving motor, or vend motor as it is commonly called.

Another object is to provide an improved dispensing mechanism adapted to dispense articles from a plurality of columns of articles in a predetermined sequence.

Another object is to provide a dispensing machine having a magazine structure adapted to contain columns of articles of different flavors or kinds, in which articles are dispensed from the several columns of a given flavor or kind in a predetermined order or sequence which is not affected by the intervening dispensing of articles from other columns, a more particular object being to provide such a machine having a common actuating means for dispensing articles from the several columns.

Another object is to provide a vending machine adapted to dispense a plurality of flavors or kinds of articles, wherein the division of the magazines into sections for the various flavors or kinds may be readily altered at the point of use of the machine with a minimum replacement of parts.

The invention is shown and described as embodied in a dispensing machine having a plurality of magazines, each adapted to contain a plurality of elongated articles of circular cross section, such as bottles or cans, in vertical columns and having means for releasing the articles therein one at a time. While such releasing means may be of any suitable type so far as the present invention is concerned, it may well be of a type having a vertically slidable plate and which supports and retains the bottles when the plate is in its lowermost position but releases a bottle when the plate is raised to its uppermost position. The releasing means of the illustrated embodiment is of this type and is described and claimed in the above-mentioned U.S. patent application Serial No. 173,222.

All of the magazines are disposed in horizontally aligned relation with each other and a vending mechanism comprising a carriage common to all the magazines and of sufficient extent to extend across all of the magazines is provided. The carriage is guided for reciprocating movement to a dispensing position and then back to a non-dispensing position, and is provided with a plurality of substantially identical pivoted lifter levers. Each of the lifters is adapted, when the lifter is rotated in one direction, to engage an associated cam plate. Accordingly, when the carriage is reciprocated, the cam plate that is engaged by its associated lifter is moved to the dispensing position and then back to its rest position, thereby actuating its associated article releasing member as previously described to dispense one of the articles.

Means is further provided for actuating only one of the lifters at a time during a dispensing operation. Such means may be referred to as an index assembly and may include a plurality of cams, each cam having a lobe adapted to be rotated into abutment with its associated lifter, thereby to move the latter into engagement with the associated cam plate. Such an index assembly together with the lifters associated therewith is hereinafter referred to as an index mechanism.

The cams of an index assembly for a group of magazines are mounted on a common rotatable shaft, and the lobes of the cams are angularly spaced from each other to such a degree that, as the camshaft is rotated an increment during a dispensing operation, one of the cam lobes is moved into abutment with its associated lifter, while the other cam lobes are disposed out of registry with their associated lifters. As the carriage returns to its rest position, the camshaft is rotated an additional increment to move the one cam lobe out of registry with its associated lever. The lobes of the other cams are also out of registry with their lifters at this time, and as long as the camshaft remains in this position, none of the articles will be dispensed even though the carriage be moved to the dispensing position.

A vending or dispensing machine having a plurality of magazines of the type described above and arranged in sections of one or more magazines each may be provided and each of these magazine sections may have an index assembly of the type described above and associated with same common carriage, including a rotatable camshaft having the required number of cams for actuating the cam plates in the magazine section. Accordingly, to dispense an article of the desired flavor, the index assembly associated with that group or section of magazines is energized to rotate its associated camshaft so that the next cam lobe moves its associated lifter into engagement or registry with one of the cam plates. As the carriage is moved to the dispensing position during the dispensing cycle, the magazine section having the article selected by the buyer dispenses one of its articles while the other magazine sections do not.

Thus, all the dispensing operaions controlled by each index assembly are effected in a predetermined order or sequence which is not affected by intervening operations controlled by another index assembly and which is resumed the next time that the first-mentioned index assembly is operated.

The foregoing and other objects are effected by the invention as will be apparent from the following description taken in connection with the accompanying drawings, forming a part of this application, in which:

FIG. 2 is a vertical sectional view taken on line II—II of FIG. 1;

FIG. 3 is a view similar to FIG. 2, but showing the mechanism in dispensing position;

Figure 1:
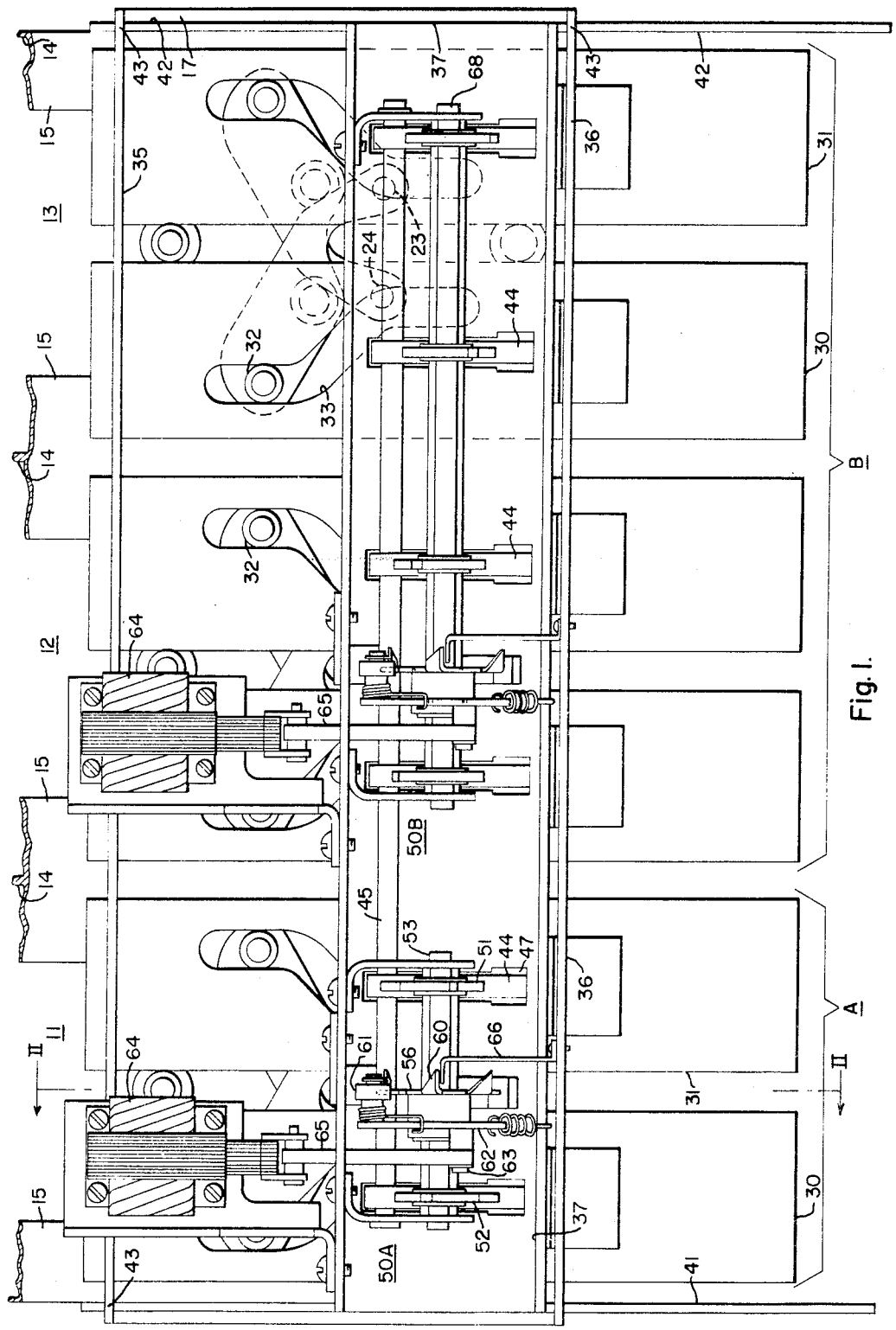
FIG. 1 is a front elevational view of a dispensing mechanism incorporating the invention, and showing a one-magazine section and a two-magazine section, the mechanism being shown in the "non-dispensing" or rest position.

Referring to the drawings in detail, there is shown a vending machine having a plurality of article-retaining magazines, in this instance three magazines 11, 12 and 13, disposed in horizontal side-by-side relation with each other. The magazines are defined by vertically extending side walls 14 and front and rear walls 15 adapted to retain a plurality of elongated articles of circular cross section, such as bottles 16, cans, or the like, the wall structure further including front and rear frame members 17 and 18.

The magazine structure may be considered as divided into sections, each section comprising one or more magazines containing bottles of the same flavor. In the illustrated embodiment, magazine section A comprises the magazine 11 for bottles of flavor A and magazine section B comprises magazines 12 and 13 for bottles of flavor B.

Figure 4:
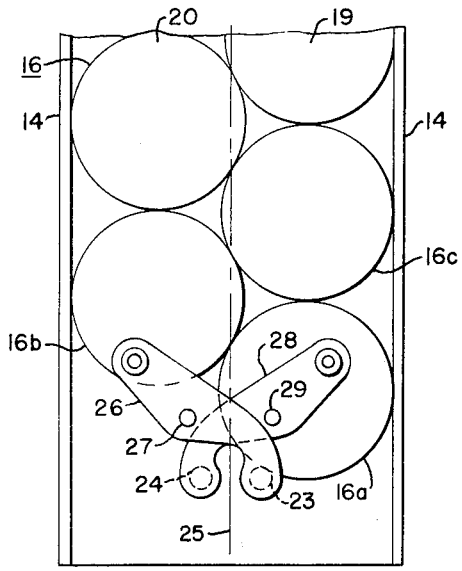
FIG. 4 is an elevational view of a magazine containing two columns of bottles arranged in staggered or corded relation and also showing the supporting and releasing elements for the two columns.
Figure 6:
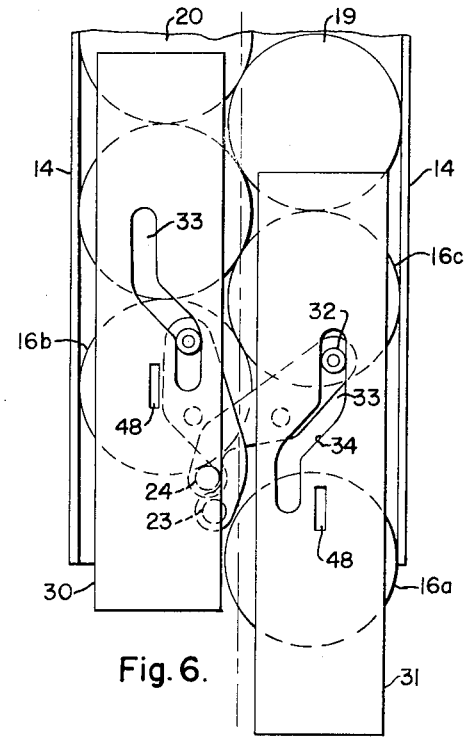
FIG. 6 is a view similar to FIG. 5, but showing one of the releasing mechanisms in releasing or dispensing position.
Figure 5:
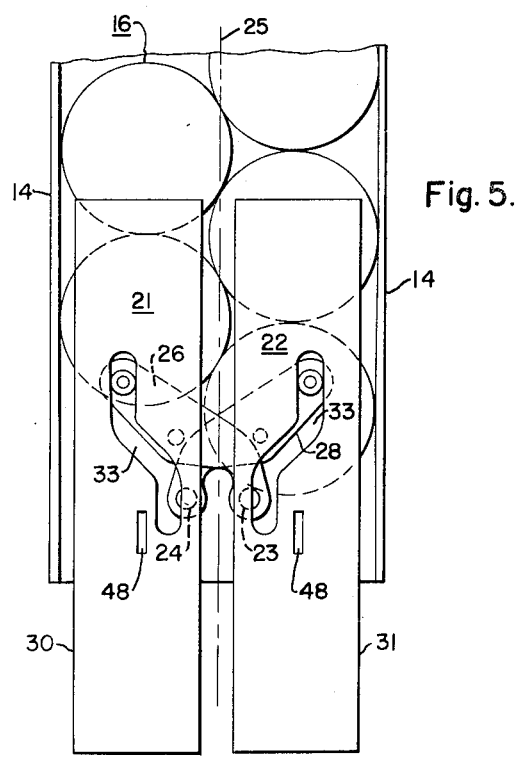
FIG. 5 is a view similar to FIG. 4, but also showing the cam plates for operating the supporting and releasing elements of the releasing mechanisms.

Also, in the illustrated embodiment, each magazine is of the corded stack type, adapted to contain two columns of bottles. The side walls 14, or at least the lower portions thereof, are horizontally spaced from each other to a slightly lesser extent than twice the diameter of the bottles 16 so that the bottles are retained in two corded or vertically staggered columns 19 and 20, as illustrated in FIGS. 4, 5 and 6 and as well known in the art.

The lowermost bottle in the columns, bottle 16a, is disposed in column 19 and the next to lowermost article or bottle 16b is disposed in column 20, with bottle 16c disposed in column 19 directly above the lowermost bottle 16a.

Each of the magazines 11, 12 and 13 is provided with a pair of releasing mechanisms 21 and 22 for releasing the lowermost bottles from the columns. Such pair of releasing mechanisms are sometimes collectively referred to as a releasing mechanism, but for the purpose of this specification, it is preferred to refer to them as releasing mechanisms, since they are separately actuated in different dispensing operations.

The releasing mechanism 21 comprises a supporting and releasing element 23 which is disposed in the lower portion of the magazine beneath column 19 for releasing the lowermost bottle in column 19 and for restraining downward movement of the two columns by abutment with the lower surface of bottle 16a. The releasing mechanism 22 comprises a supporting and releasing element 24 disposed beneath column 20. The releasing elements are in the form of rods extending from front to rear and, as shown in FIGS. 4 and 5, are disposed in the rest positions on opposite sides of a central plane 25 extending vertically of the magazine 11 and equidistantly from the side walls 14 thereof.

The releasing rod 23 is pivotally supported from the front and rear frames 17 and 18 by levers 26 and 26a, respectively, for arcuate movement about pivots 27 disposed on a common horizontal axis, while the releasing rod 24 is pivotally supported from said front and rear walls by levers 28 and 28a, respectively, for arcuate movement about pivots 29 disposed on a common horizontal axis.

The releasing rods 23 and 24 are actuated by a pair of cam plates 30 and 31 and the levers 26 and 28 are provided with cam rollers or followers 32 received in suitable slots 33 formed in the cam plates. The cam plates 30 and 31 are mirror images of each other. The slot 33 is provided with vertically extending upper and lower end portions connected to each other by a central inclined or "camthrow" portion 34. Hence, as the cam plate 30 is moved upwardly, the lever 26 is rotated clockwise as dictated by the position of its follower 32 in the slot 33, and as the cam plate 31 is moved upwardly, the lever 28 is rotated counterclockwise.

In FIG. 5, the cam plates 30 and 31 are in their lowermost positions with the rollers disposed in the upper ends of the slots 33. To dispense bottle 16a, which is the lowermost in the columns and hence the first to be dispensed, the cam plate 30 is raised to rotate the lever 26 in clockwise direction about the pivots 27, thereby moving the releasing rod 23 downwardly and to the left to the position shown in FIG. 6. The lowermost bottle 16a is lowered and, together with it, both of the columns 19 and 20, until further downward movement of the bottles above the lowermost is arrested by abutment of bottle 16b with the releasing rod 24, after which bottle 16a is fully released and permitted to drop out of the magazine, as illustrated in FIG. 6. After the releasing operation, the lever 26 is rotated in counterclockwise direction until the rod 23 is returned to its original or rest position, as shown in FIG. 4.

During the next dispensing operation, the releasing rod 24 is actuated in substantially the same manner, but in counterclockwise direction, by its cam plate 31 to release bottle 16b, thereby permitting downward movement of the two columns until further motion of the bottles above the lowermost is arrested by abutment of bottle 16c with the rod 23. The rod 24 is then returned to its rest position by rotation in clockwise direction.

The front frame member 17 is of U-shape cross section and is provided with upper and lower horizontally-extending flange portions 35 and 36, respectively, having six pairs of suitable elongated apertures provided therein to slidably receive the cam plates 30 and 31.

In accordance with the invention, the several releasing mechanisms 21 and 22 are actuated by a mechanism including a carriage 37 that is arranged to raise and lower the cam plates alternately in each magazine in order to dispense bottles from the columns retained therein. This carriage comprises a horizontally elongated U-shaped or channel member vertically movable between the upper and lower flange portions 35 and 36 and comprising upper and lower horizontal planar portions 38 and 39 connected to a vertical planar portion 40. The channel member 37 is supported by vertically extending guide strips 41 and 42 connected thereto and vertically slidable in slots 43 formed in the upper and lower flange portions 35 and 36 to provide for vertical reciprocating movement, as indicated by the double headed arrows in FIG. 1. The carriage 37 is raised and lowered for each dispensing operation by any suitable actuating mechanism, energized by a suitable drive or vend motor, through levers 37a mounted on an oscillating shaft 37b and having pins 37c extending through slots 37d in the lower ends of guide strips 41 and 42.

Within the bight of the channel member 37, there are provided a series of engaging elements 44, one for engaging each of the cam plates 30 and 31. These engaging elements, also termed lifter levers, are rotatably mounted on a shaft 45 and pivotally depend therefrom, but are biased in a direction away from their associated cam plates in any suitable manner, as by gravity. Each lifter lever 44 is provided with a finger 46 disposed in alignment with a slot 47 formed in the channel member 37, and each of the cam plates 30 and 31 is provided with an aperture 48 disposed in juxtaposition with the finger 46 of the lifter lever when the cam plate and the channel member 37 are in the rest position.

To effect operation of the releasing mechanism for the selected column, there are provided an index assembly 50A for the releasing mechanisms of magazine section A, and a similar index mechanism 50B for the releasing mechanisms of magazine section B. The index mechanism 50A comprises rotatable cams 51 and 52 mounted upon a rotatable shaft 53 carried by the channel member 37, the cams being disposed in registry with the respective lifters 44 of magazine section A.

Figure 7:
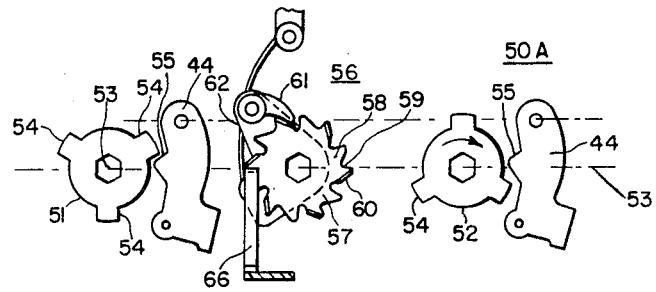
FIGS. 7, 8 and 9 are schematic views of an index mechanism including a cam and ratchet wheel assembly for the one magazine section, the views illustrating this mechanism in the position attained immediately before, during and after release of an article from the section, respectively.
Figure 8:
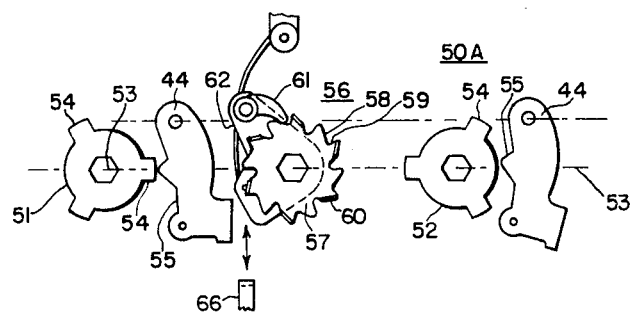

Referring to FIGS. 7 and 8, it will be noted that each of the cams 51 and 52 is provided with three lobes 54 which are spaced equi-angularly or 120° apart, the lobes of one cam being disposed 60° from the lobes of the other cam; in other words, one-half of the angular spacing between adjacent lobes on each cam. Each lifter 44 is provided with a raised or cam follower portion 55 adapted to be engaged by a lobe of its associated cam and, when so engaged, the lifter 44 is rotated in counterclockwise direction a distance sufficient to move its associated finger 46 into registry with the slot 48 of the associated cam plate.

The index assembly 50A further includes a ratchet and pawl assembly 56 for rotating the cam shaft 53 in angular increments. The assembly 56 includes a ratchet wheel 57 fixedly attached to the cam shaft 53 and having a plurality of teeth 58 and 59 disposed in an alternating annular array about the wheel 57. The teeth 58 are disposed in the plane of the wheel while the teeth 59 are formed with offset portions 60 extending in a direction parallel to the axis of the shaft 53. In the example shown, since the cams 51 and 52 include a total of six lobes, the ratchet wheel is provided with six teeth 58 and six teeth 59. The teeth of the ratchet wheel 57 are cooperatively associated with a pawl 61 pivotally mounted on a suitable bell crank 62, and the bell crank is rotatably supported by the cam shaft 53 and has a pin 63 connected to a solenoid 64 by a suitable link 65 (see FIG. 1).

The offset tooth portions 60 are adapted to be engaged by a suitable spring finger 66 connected to the lower flange 36 of the member 17 and extending upwardly therefrom.

In operation, articles may be dispensed from magazine section A as follows: The solenoid 64 is first actuated momentarily, thereby lifting its associated link 65 and rotating the pawl 61 in clockwise direction a sufficient extent to rotate the ratchet wheel 57 an angular increment equal to the angular space between a pair of adjacent teeth 58 and 59. Since, as mentioned above, the ratchet wheel 57 has a total of twelve teeth, the angular spacing between a pair of adjacent teeth 58 and 59 is 30°. In FIG. 7, the cam and ratchet wheel structure is illustrated in a position immediately before a dispensing operation. Hence, by referring to cam 51, it will be noted that when the ratchet wheel 57 is rotated 30° clockwise, the adjacent lobe 54 of the cam 51 will move into abutment with the follower 55 and rotate the lifter 44 counterclockwise to cause engagement of its finger 46 with the slot 48 in the cam plate 30. Immediately subsequent thereto, the carriage 37 is translated upwardly, as indicated in FIG. 3, thereby lifting the cam plate 30 in the manner previously described and rotating the associated releasing element or rod 23 to the position shown in FIG. 6 and releasing the bottle 16a. During such upward movement of the carriage 37, one of the offset tooth portions 60 moves above the horizontal flange at the upper end of the spring finger 66, the latter being temporarily deflected to the right, as seen in FIG. 2, by the inclined surface of the tooth portion. The carriage 37 is then returned to its original position shown in FIG. 2 and during such motion, the cam plate 30 moves downwardly to return releasing rod 23 to its rest position and the finger 66 engages the last-mentioned ratchet tooth portion 60, thereby rotating the ratchet wheel 57 an additional angular increment of 30° or the distance between a pair of adjacent teeth. Accordingly, the cam 51 is rotated to the position shown in FIG. 9 wherein its cam lobe 54 which originally had been in registry with the cam follower 55 (see FIG. 8) is advanced and moved out of registry with the cam follower 55, thereby permitting the lifter 44 to return to its original position as illustrated in FIG. 2 and disengaging the cam plate 30.

It will be noted that during the operation of the cam shaft 53, and during its rotation in the two angular increments of 30° as mentioned above, the cam 52 is also rotated the same angular extent as the cam 51. However, during this time none of its cam lobes 54 is moved into abutment with the associated cam follower 55 of the lifter lever 44. By referring to FIG. 9, however, it will be noted that one of the cam lobes 54 of cam 52 has been advanced to a position immediately above and 30° from the cam follower 55. Hence, during the next dispensing operation of the index mechanism 50A, rotation of the cam shaft 53 by the solenoid 64 is effective to bring this cam lobe 54 into engagement with the follower 55 before upward movement of the carriage 37, and subsequent return of the carriage to its original position is effective to cause advancement beyond engagement with the follower 55, bringing the mechanism to a position the same as that illustrated in FIG. 7 for the next operation controlled by cam 51.

Figure 9:
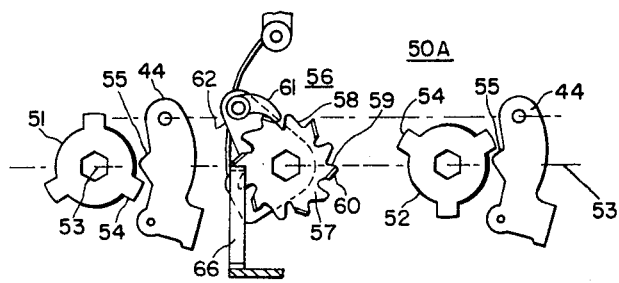
Figure 10:
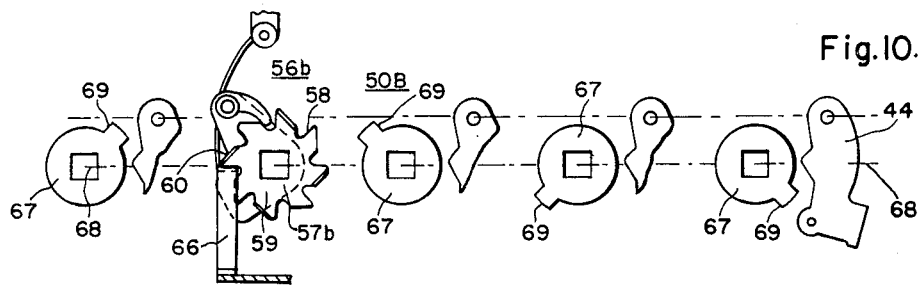
FIG. 10 is a view similar to FIG. 7, but illustrating an index mechanism for the two-magazine section.

By referring to FIGS. 7 to 9 inclusive, it will be noted that during a dispensing operation only one cam lobe is brought into registry with an associated lifter element. Also, at the end of a dispensing operation all of the cam lobes are disposed out of registry with their associated lifters 44, so that the cam plates 30 and 31 are disengaged from the carriage 37.

It will be apparent that each lifter finger 44 of section A is operated three times during each rotation of the shaft 53, since there are three lobes 54 on each of the two cams 51 and 52. It will also be noted that, since these lobes are displaced from each other, the lifters 44 are operated in alternating sequence.

Index mechanism 50B for magazine section B is similar to index mechanism 50A except that it is adapted to control the releasing mechanisms of the four columns in magazine section B and, therefore, comprises four cams 67 mounted on a shaft 68 in operative relation to the four lifters 44 for the cam plates of section B. Each cam 67 is provided with a single lobe 69 and is mounted on the shaft 68 with its lobe angularly displaced 90° from the lobe of the next cam.

The shaft 68 is actuated by a pawl and ratchet assembly 56b which is similar to the assembly 56 except that its ratchet wheel 57b is provided with four planar teeth 58 and four teeth 59 with offset portions 60 instead of six each, and the mechanism is designed to rotate the assembly 45° instead of 30° upon each energization of its solenoid 64 and upon each return movement of the carriage 37, the latter being effected by the spring finger 66.

The operation of index mechanism 50B is the same as that of index mechanism 50A, except that this mechanism causes the dispensing of one bottle from each of four columns during one complete rotation of the shaft 68. Its operation is similar in that at the end of each dispensing operation, the shaft 68 is returned to a position in which all cams are out of registry with the follower portions 55 of the lifters 44, so that no bottle is dispensed from section B if the carriage is moved upwardly without operation of the index mechanism 50B calling for dispensing of a bottle from section B.

Figure 11:
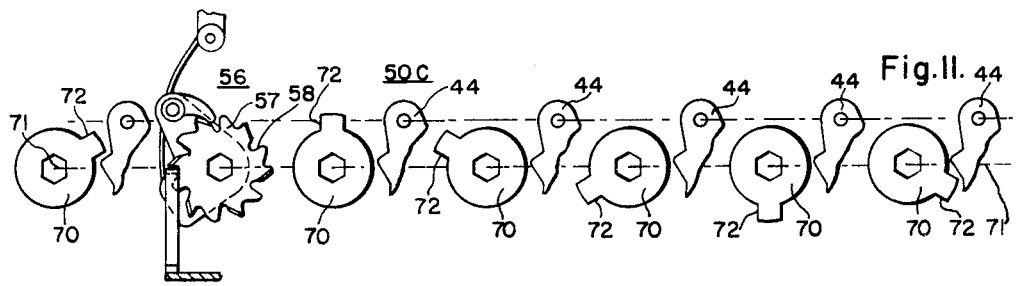
FIG. 11 is a view similar to FIG. 7, but illustrating an index mechanism for a three-magazine section (not shown).

In FIG. 11, there is shown an index mechanism 50C which is not incorporated in the vending machine shown in FIG. 1, although it could be. It is similar to the other index mechanisms except that it is adapted to control the releasing mechanisms of six columns and, therefore, comprises six cams 70 mounted on a shaft 71 in operative relation to six lifters 44. Each cam 70 is provided with a single lobe 72 and is mounted on the shaft 71 with its lobe angularly displaced 60° from the lobe of the next cam.

The shaft 71 is actuated by a pawl and ratchet mechanism 56 identical with that of mechanism 50A, its ratchet wheel 57 being provided with six planar teeth 58 and six teeth 59 with offset portions 60. The index mechanism 50C is adapted to effect operation of its six releasing mechanisms in sequence during each rotation of the shaft, which sequence is repeated continuously upon successive rotations of the shaft.

The operation of the dispensing machine as a whole will now be considered. Assuming that a customer desires to obtain a bottle of beverage of flavor B, the solenoid 64 of the index assembly 50B is energized, as is also the actuating means for raising and lowering the carriage 37. Controls whereby such operations may be effected are well-known and form no part of the present invention. The solenoid 64, through the bell crank 62, advances the shaft 68 45°, bringing a lobe 69 into engagement with the raised portion 55 of the associated lifter 44, the latter being rotated to bring its projection 46 into engagement with the slot 48 of the associated cam plate 30 or 31. Accordingly, as the carriage raises the cam plate engaged by the lifter 44, the latter moves its associated support rod 23 or 24 to release the lowermost bottle in the associated column of bottles in magazine section B as described above. Upon downward movement of the carriage 37, the cam plate is lowered to return the support rod to its support position. As the carriage 37 approaches the lower end of its travel, the finger 66 engages one of the tooth portions 60 of the ratchet wheel, causing the wheel to rotate another 45° to its neutral or non-dispensing position in which no cam lobe is in engagement with a follower portion 55.

During the dispensing operation of section B just described, the index assembly 50A for flavor A remains in its neutral or non-dispensing position and is unaffected by the mentioned dispensing operation for flavor section B. Accordingly, the next time that the machine is operated to dispense a bottle from magazine section A, the index assembly 50A will be advanced to the next position in its sequence; in other words, it will resume its sequence just as if there had been no intervening dispensing of any bottle from section B.

Likewise, if the next dispensing operation or operations of the machine are from section A, the index mechanism 50B remains in the position to which it was moved the last time that it was operated. Accordingly, the next time that the machine is operated to dispense a bottle from section B, the index mechanism 50B will resume or continue on with its sequence just as if there had been no intervening operations of index mechanism 50A.

Thus, it will be noted that each index mechanism is returned to its non-dispensing position at the end of its operation, so that no article will be dispensed therefrom during the next operation of the actuating mechanism. In fact, in the event of operation of the actuating mechanism without operation of any index mechanism, which might result from malfunctioning of the control, the actuating mechanism may operate and raise and lower the carriage 37 without dispensing any bottle from the machine.

Each index mechanism which controls more than two releasing mechanisms may have its cams arranged to provide operation of the several releasing mechanisms in any desired sequence or order.

While in the illustrated embodiment, two releasing mechanisms are arranged in a pair associated with one magazine, it is to be understood that the invention is in no wise so limited.

Any of the index assemblies described may be used with a single flavor machine. For example, the index assembly 50C shown in FIG. 11 may be used with the dispensing machine shown in FIG. 1 if it is desired to dispense bottles of a single flavor therefrom. In such case, it is not necessary to advance the index assembly to a neutral or non-dispensing position at the end of a dispensing operation. Accordingly, the spring finger 66 may be omitted, but if this is done, the pawl and ratchet assembly is designed to advance the ratchet wheel an angle equal to the space between adjacent cam lobes, in this case, 60° to provide the additional movement otherwise provided by engagement of the spring finger 66 with a tooth portion 60.

An advantage of the present invention is that it is readily possible to modify a dispensing machine at the point of use to change the division of the group of magazines into the sections for the respective flavors. For example, the illustrated machine may be modified to dispense three different flavors in the three magazines by merely removing the index mechanism 50B and replacing it with two index mechanisms 50A for the magazines 12 and 13. Alternatively, it may be modified to make it a single drink machine by removing both index mechanisms 50A and 50B and replacing them with a single index mechanism 50C. Of course, appropriate modification in the control must also be made.

What is claimed is:

1. A dispensing machine comprising
   a magazine structure adapted to contain a plurality of columns of articles,
   a releasing mechanism for each column for releasing the lowermost article therefrom,
   a common actuating means for actuating said releasing mechanisms,
   a first index mechanism associated with a plurality of said releasing mechanisms for selectively effecting driving connection between said actuating means and a selected one of said associated releasing mechanisms,
   a second index mechanism associated with one or more other releasing mechanisms for selectively effecting driving connection between said actuating means and an associated releasing mechanism,
   each of said index mechanisms having an effective position and an ineffective position,
   means for actuating each of said index mechanisms to its effective position,
   said first index mechanism effecting driving connection with its associated releasing mechanisms in a predetermined, continuously repeated, sequence upon successive actuations thereof to effective position, and
   means for returning an actuated index mechanism to its ineffective position at the end of a dispensing operation,
   said returned index mechanism being unaffected by succeeding operations of another index mechanism or mechanisms, so that, the next time that it operates, it continues with its own sequence regardless of intervening operations by any other index mechanism or mechanisms.

2. In a multiple flavor dispensing machine, the combination of
   a magazine structure adapted to contain a plurality of columns of articles to be dispensed,
   said magazine structure having respective article releasing mechanisms at the respective lower ends of said columns,
   a movable structure for operating a selected one of said article releasing mechanisms,
   first actuating means for effecting movement of said movable structure first in one direction and then in the opposite direction,
   said movable structure including an engaging element for each of said releasing mechanisms, which engaging element is movable into an engaging position in which it engages the associated releasing mechanism upon said movement of the movable structure in said one direction but is normally in a disengaging position in which it does not engage said releasing mechanism upon such movement,
   first and second rotatable shafts for operating said engaging elements, each of said shafts operating a plurality of engaging elements,
   a second actuating means associated with each shaft adapted upon energization to effect rotational movement thereof in angular increments, each shaft being adapted, upon successive actuations thereof, to move its engaging elements successively into engaging position with their associated releasing mechanisms, one at a time, and means operable upon movement of said movable structure in said opposite direction to further rotate the selected shaft to a non-dispensing or neutral position in which the engaging element that was moved into engaging position thereby is retracted or moved from engaging position to disengaging position.

3. In a multiple flavor dispensing machine, the combination of a magazine structure adapted to contain columns of articles to be dispensed, said magazine structure having article releasing elements at the lowering ends of said columns, a movable cam plate connected to each of said releasing elements for moving it from an article supporting position to an article releasing position, a movable structure for operating the selected article releasing element, drive means for effecting movement of said movable structure first in one direction and then in the opposite direction.

said movable structure including an engaging element for each of said cam plates movable into an engaging position in which it engages the associated cam plate upon said movement of the movable structure in said one direction but normally in a disengaging position in which it does not engage said cam plate upon such movement, first and second rotatable shafts for operating the engaging elements of first and second groups of such elements, actuating means associated with each shaft and adapted upon energization to effect rotational movement thereof in angular increments, each shaft being adapted, upon successive actuations thereof by its actuating means, to move its engaging elements successively into engaging position with their associated cam plates, one at a time, and means operable upon movement of said movable structure in said opposite direction to further rotate the selected shaft to a non-dispensing or neutral position in which the engaging element that was moved into engaging position thereby is retracted or moved from engaging position to a disengaging position.

4. In a multiple flavor dispensing machine, the combination of a magazine structure adapted to contain columns of articles to be dispensed, said magazine structure having article releasing elements at the lower ends of said columns, a movable cam plate operatively connected to each of said releasing elements for moving said releasing element to and from an article releasing position, a movable structure for operating a selected cam plate, drive means for effecting movement of said movable structure in one direction and in the opposite direction, said movable structure including an elongated carriage, an engaging element for each of said cam plates pivotally connected to said carriage and movable into an engaging position in which it engages the associated cam plate upon said movement of the movable structure in said one direction but normally in a disengaging position in which it does not engage said cam plate upon such movement, first and second groups of rotatable cam members, each of which has a radially extending lobe operatively associated with one of said engaging elements, first and second rotatable shafts carrying said first and second groups of cam members, respectively, actuating means associated with each shaft and adapted upon energization to effect rotational movement thereof in angular increments less than the angular displacement of adjacent cam lobes, each shaft being adapted, upon successive actuations thereof by its actuating means, to move its cam lobes successively into engaging position with their associated engaging elements, one at a time, and means operable upon return movement of said movable structure in said opposite direction to further rotate the selected shaft the remaining angular increment of the angular displacement of adjacent cam lobes, thereby to retract the engaging element that was moved into engaging position.

5. An article dispensing machine comprising a magazine structure for articles to be dispensed, a plurality of releasing mechanisms for releasing articles from said magazine structure, a common actuating means for actuating said releasing mechanisms, a first coupling mechanism associated with a plurality of said releasing mechanisms, and a second coupling mechanism associated with a plurality of other of said releasing mechanisms, each coupling mechanism having a plurality of effective positions in which it is operable to connect different ones of its associated releasing mechanisms to said common actuating means and having ineffective positions in which it does not connect any releasing mechanism to said common actuating means, each coupling mechanism having means including a solenoid and operable upon each successive energization of its solenoid to actuate the coupling mechanism to a different effective position for operating a different releasing mechanism, according to a predetermined sequence, and each coupling mechanism also having means for actuating the same to an ineffective position thereof upon the completion of a dispensing operation of the machine, each coupling mechanism, during a dispensing operation of the machine in which its solenoid is not energized, remaining in the ineffective positon to which it has been actuated so that, upon the next operation of the machine in which its solenoid is energized, the coupling mechanism resumes its predetermined sequence.

References Cited by the Examiner

UNITED STATES PATENTS

| 937,820 | 10/09 | Ladue | 221—115 |
|---|---|---|---|
| 1,940,603 | 12/33 | Nicholson | 221—126 |
| 2,240,389 | 4/41 | Campbell et al. | 221—115 X |
| 2,392,511 | 1/46 | Thompson et al. | 194—10 X |
| 2,956,661 | 10/60 | Radcliffe | 221—67 X |

LOUIS J. DEMBO, *Primary Examiner.*

KENNETH N. LEIMER, RAPHAEL M. LUPO,
*Examiners.*